US008558716B2

(12) United States Patent
Roberts et al.

(10) Patent No.: US 8,558,716 B2
(45) Date of Patent: Oct. 15, 2013

(54) SYSTEMS AND METHODS TO ADAPTIVELY CHANGE FUNCTIONALITY OF A REMOTE CONTROL DEVICE TO EXECUTE THE SCRIPT ON A CLIENT PROGRAM FOR REPROGRAMMING BUTTONS ON THE REMOTE CONTROL DEVICE

(75) Inventors: Brian F. Roberts, Dallas, TX (US); Sudhanshu Sharma, Coppell, TX (US); Carl Randall Mosty, Rowlett, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 674 days.

(21) Appl. No.: 12/797,836

(22) Filed: Jun. 10, 2010

(65) Prior Publication Data
US 2011/0304778 A1 Dec. 15, 2011

(51) Int. Cl.
  *G08B 5/00* (2006.01)
  *G05B 11/01* (2006.01)
  *G08C 19/16* (2006.01)
  *H04L 17/02* (2006.01)
  *H04N 5/44* (2011.01)

(52) U.S. Cl.
  USPC .......... 340/815.6; 340/12.22; 340/12.25; 340/426.14; 340/4.11; 341/176; 715/744; 348/734; 348/563; 348/E5.096

(58) Field of Classification Search
  USPC .................................. 340/815.6
  See application file for complete search history.

(56) References Cited

U.S. PATENT DOCUMENTS

| | | | | |
|---|---|---|---|---|
| 5,648,824 A | * | 7/1997 | Dunn et al. | 725/88 |
| 7,705,746 B2 | * | 4/2010 | Pittard et al. | 340/12.24 |
| 7,932,811 B2 | * | 4/2011 | Tanabe et al. | 340/5.64 |
| 7,936,253 B2 | * | 5/2011 | Ishimoto et al. | 340/13.24 |
| 8,117,254 B2 | * | 2/2012 | Nirkhe et al. | 709/203 |
| 2005/0080496 A1 | | 4/2005 | Hayes et al. | |
| 2006/0143572 A1 | | 6/2006 | Scott et al. | |
| 2008/0151125 A1 | * | 6/2008 | Bucchieri | 348/734 |
| 2008/0199010 A1 | | 8/2008 | Ogawa et al. | |
| 2009/0115723 A1 | | 5/2009 | Henty | |
| 2009/0138910 A1 | * | 5/2009 | Jin et al. | 725/38 |
| 2009/0161579 A1 | * | 6/2009 | Saaranen et al. | 370/254 |
| 2009/0284472 A1 | | 11/2009 | Mehta et al. | |
| 2011/0114716 A1 | * | 5/2011 | Pratt | 235/375 |

* cited by examiner

*Primary Examiner* — Jennifer Mehmood
*Assistant Examiner* — Fekadeselassie Girma

(57) ABSTRACT

A media client receives, from a remote control device, a signal to launch a selected interactive television application and sends, to the remote control device, a client program for reprogramming buttons on the remote control device. The media client sends, to the remote control device, a script, for button functions of the remote control device, which are based on the selected interactive television application. The remote control device executes the script on the client program to reprogram the buttons functions. The media client presents, on a display device, a button map that corresponds to the script, and receives, from the remote control device, a signal based on the scripting.

25 Claims, 9 Drawing Sheets

SYSTEMS AND METHODS TO ADAPTIVELY CHANGE FUNCTIONALITY OF A REMOTE CONTROL DEVICE TO EXECUTE THE SCRIPT ON A CLIENT PROGRAM FOR REPROGRAMMING BUTTONS ON THE REMOTE CONTROL DEVICE

BACKGROUND INFORMATION

In an increasingly digitally connected world, telecommunication services play a crucial role in consumers' lives. Television, in particular, is one service that may be provided to consumers. In subscription television services (e.g., cable, satellite, etc.) incoming television signals are received by a signal processing device, such as a media client or set-top-box (STB), before being forwarded to the consumer's audio/video equipment (e.g., television). Along with conventional linear television programming, a growing number of interactive television options are being provided. The consumer may generally control what is watched on the television by controlling the STB through a remote control. However, many interactive television applications require more complex user input than is possible using a conventional hand-held remote control.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods to adaptively change functionality of a remote control device. Particularly, systems and/or methods herein may receive, from a remote control device, a signal indicating a user selection of particular multimedia content (e.g., from an option displayed on a television or another display device). The media client may send a signal to the remote control device to alter the orientation and/or key mapping of the remote control device so that the particular multimedia content may have a customized interface on the remote control device. In one implementation, the media client may present, on the display device, a key map to identify functions of adaptive keys (or buttons). In another implementation, the remote control device may adapt key functions depending on an orientation of the remote control device (e.g., in relation to the media client).

Figure 1:
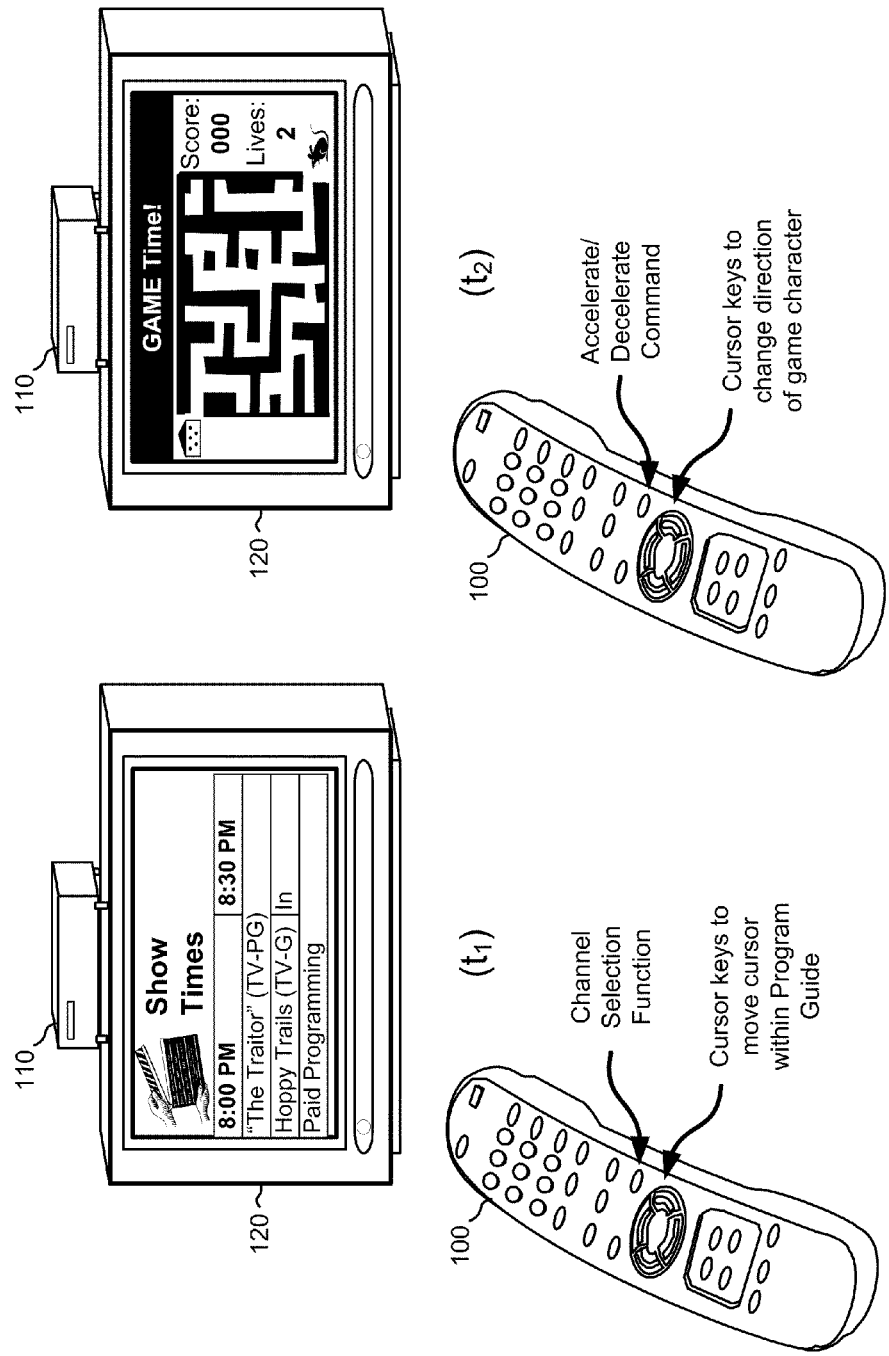
FIG. 1 provides a diagram illustrating concepts described herein.

FIG. 1 provides a diagram illustrating concepts described herein. As shown in FIG. 1, a remote control device 100 (referred to hereafter as "remote control 100") may be used to interact with a media client 110 that presents multimedia content on a display device 120. Using media client 110, a user may access a variety of multimedia content such as television programming, on-demand programming, electronic program guides, and interactive content. Remote control 100 may have numerous keys that provide particular signals to media client 110 to enable a user to interact with media client 110/display device 120. Assume that a user, at a time $t_1$, browses through an electronic program guide (e.g., "Show Times") using remote control 100. The user may, for example, press directional buttons (e.g., up, down, left, right) to selectively highlight available programming options displayed on the electronic program guide. Pressing a "select" or "OK" button on remote control 100 may cause media client 110 to switch to a channel corresponding to the highlighted entry. The user may navigate to another channel using, for example, a particular button that provides a channel selection function, such as a "last channel" key that causes media client 110 to switch to a previously viewed channel.

Assume, for example, the user later selects an interactive game application from an option menu that media client 110 displays on display device 120. The user's selection of the interactive game application (via remote control 100), may cause media client 110 to send a signal to remote control 100 to re-map functions of some keys of remote control 100. Thus, at a time $t_2$, pressing some of the same buttons on remote control 100 that were previously pressed at time $t_1$ may result in different signals (e.g., infrared codes, wireless network signals, etc.) being sent to media client 110. For example, the direction buttons may provide a direction indication for a game character (e.g., instead of movement of a cursor). Also, the same key that previously (at time $t_1$) provided a channel selection function may now (at time $t_2$) provide an acceleration/deceleration command for the game character.

Remote control 100, media client 110, and display device 120 are described in more detail in connection with, for example, FIGS. 2-9. As used herein, the terms "user," "viewer," and "subscriber" may refer interchangeably to a person who interacts with a media client/display device via a remote control.

Figure 2:
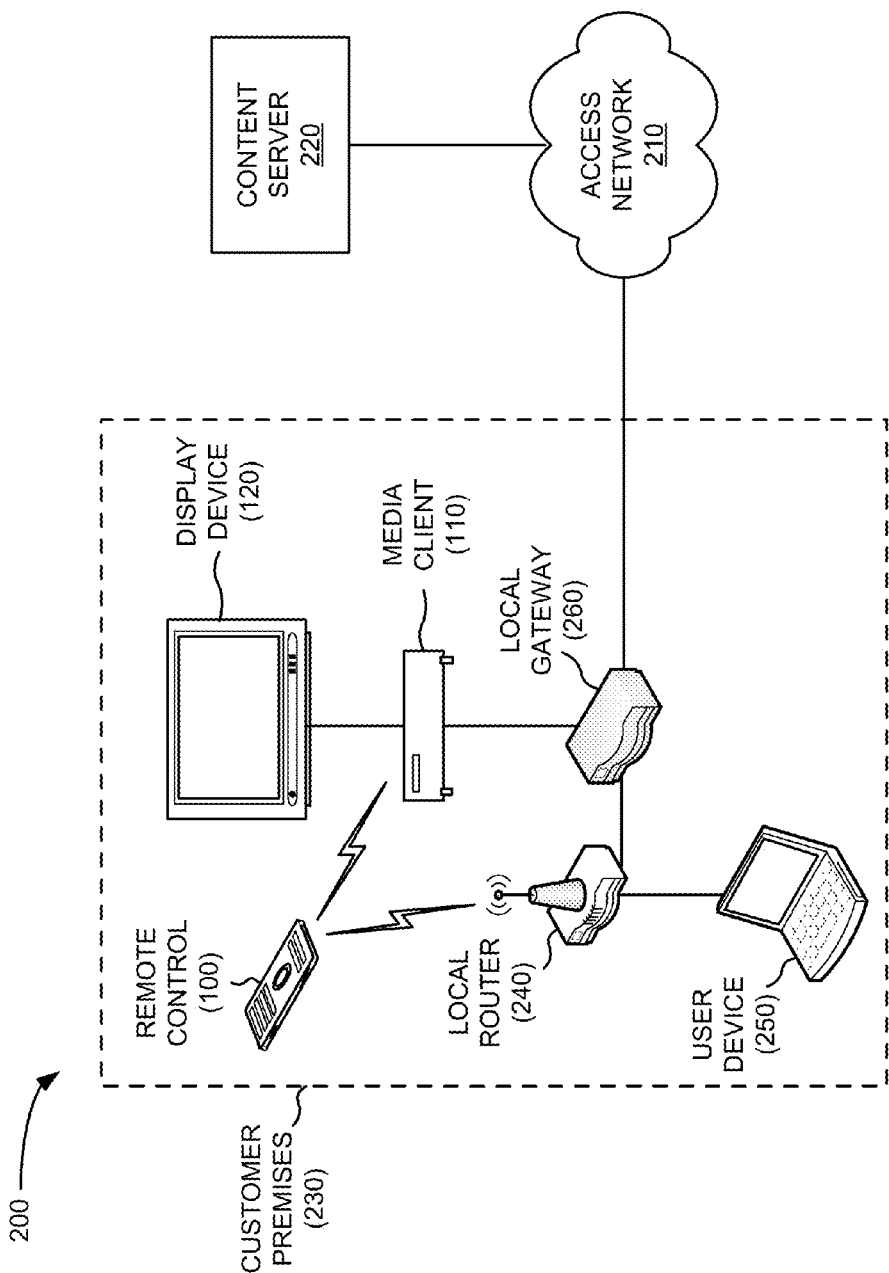
FIG. 2 depicts an example network in which systems and/or methods described herein may be implemented.

FIG. 2 is a diagram of an example network 200 in which systems and/or methods described herein may be implemented. As illustrated, network 200 may include an access network 210 interconnecting a content server 220 and customer premises 230. Customer premises 230 may include remote control 100, video client 110, display device 120, a local router 240, a user device 250, and a local gateway 260. Customer premises 230 may be connected via access network 210 to content server 220 located at, for example, a subscription multimedia service provider's location. Components of network 200 may interconnect via wired and/or wireless connections.

For simplicity, a single access network 210, content server 220, and customer premises 230 (including one remote control 100, one video client 110, one display device 120, one local router 240, one user device 250, and one local gateway 260) and have been illustrated in FIG. 2. In practice, there may be more access networks 210, content servers 220, customer premises 230, and/or more components within any of these components. Also, in some instances, one or more of the components of network 200 may perform one or more functions described as being performed by another one or more of the components of network 200.

Access network 210 may provide customers with multimedia content provided, for example, by content server 220. Access network 210 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 2, access network 210 may include a number of separate networks that function to provide services to customer premises 230. In one implementation, access network 210 may terminate at customer premises 230 via an optical communication link, such as an optical fiber provided to customer premises 230. In another possible implementation, access network 210 may terminate at customer premises 230 via a coaxial cable. In still another implementation, access network 210 may terminate at customer premises 230 via a wireless (e.g., satellite) connection.

Content server 220 may include one or more server devices, or other types of computation or communication devices, that gather, process, search, and/or provide information in a manner described herein. In one implementation, content server 220 may include a computer system, an application, a cable head-end, and/or a broadcasting device capable of providing content (e.g., interactive television applications, video-on-demand (VOD) content, high definition (HD)-VOD content, TV programming, movies, on-demand services, live television, etc.), advertisements, instructions, and/or other information to media client 110.

Customer premises 230 may include a network of remote control 100, video client 110, display device 120, local router 240, user device 250, and local gateway 260. Customer premises 230 may also include additional devices (not shown), such as other routers, mobile devices, telephones, etc. Devices within customer premises network 230 may be connected via wired connections (e.g., coaxial cable or Ethernet connections) or wireless connections (e.g., using network devices such as those available under the IEEE 802.11 wireless LAN standards). Customer premises 230 may also be referred to as a home media network.

Remote control 100 may include a device that allows a user to control television programming and/or other multimedia content displayed on display device 120 via interaction with media client 110 and/or display device 120. For example, remote control 100 may alter television programming provided to display device 120 via user selection of a channel up or channel down button of remote control 100. In some implementations, remote control 100 may include one or more infrared transmitters and/or wireless radios to facilitate communications with media client 110 and/or display device 120. Further details of remote control 100 are provided below in connection with, for example, FIGS. 3 and 4.

Media client 110 may include any device capable of receiving, transmitting, and/or processing information to and/or from access network 210. In one implementation, media client 110 may be a closed device (e.g., including a hardware/software configuration that is not accessible to the general public). Examples of media client 110 may include a set-top box (STB), a computer, a cable card, a television, and a portable electronic device (e.g., a cell phone, a personal digital assistant (PDA), etc.). Media client 110 may receive a television or other multimedia signal from local gateway 260, may convert the signal to a form usable by display device 120, and may transmit the signal to display device 120 for display. In an example implementation, media client 110 may also include processing capabilities to execute interactive television applications and transmit signals (e.g., via local router 240, an ad hoc wireless network, etc.) to remote control 100.

In an implementation, media client 110 may include a combination of hardware and software to re-map keys of remote control 100 in response to launching of a particular interactive television application. For example, based on information within an interactive television application and stored information about a model type of remote control 100, media client 110 may send a signal to remote control 100 to re-map functions of some keys of remote control 100.

Display device 120 may include a digital or analog display via which a user may view multimedia content (including, for example, conventional programming, interactive displays, and/or advertising). Display device 120 may refer to any device (including, for example, a conventional television) that can receive and display multimedia content delivered over access network 230 and/or through media client 110 for perception by users. Display device 120 may include technologies, such as cathode ray tube (CRT) displays, liquid crystal displays (LCDs), light-emitting diode (LED) displays, plasma displays, etc.

Local router 240 may include a device that may provide connectivity between equipment (e.g., remote control 100, media client 110, and/or user device 250) within customer premises 230 and access network 210. Local router 240 may also include a wireless router that may permit a wireless user device (e.g., remote control 100 and/or user device 250) to connect to other customer premises equipment and/or gain access to access network 210. In one implementation, local router 240 may facilitate wireless communications between remote control 100 and media client 110.

User device 250 may include any type or form of computation or communication device that may communicate via a network. User device 250 may include, for example, a personal computer, a laptop computer, a personal digital assistant (PDA), or another type of computation or communication device that may connect to local router 240 via a wired or wireless connection. In one implementation, user device 250 may communicate with remote control 100 via a wired or wireless connection.

Local gateway 260 may include a network device that provides an interface from access network 210 to media client 110 and/or local router 240. For example, when telecommunication services are provided to customer premises 230 via an optical fiber, local gateway 260 may include an optical network terminal (ONT) that connects to the optical fiber. The ONT may convert between signals appropriate for display device 120 and signals appropriate for transmission over optical fiber. For example, the ONT may include a coaxial cable connection that leads to media client 110 or display device 120. The ONT may also include an Ethernet output port for connecting to local router 240 or user device 250. Local gateway 260 may include one of a number of possible gateway devices, including a satellite antenna and receiver, a coaxial cable connection, an ONT, or a broadband access for Internet Protocol TV (IPTV). The satellite antenna and receiver may provide an interface for television services broadcast from satellites. The coaxial cable connection may provide an interface for television services connected to a customer via coaxial cables. The ONT may provide an interface for an optical fiber connection. The broadband IPTV access may generally include any device that provides broadband access over which television service may be provided.

In implementations described herein, a user at customer premises 230 may interact with media client 110 via remote control 100 to request media content. Content server 220 may provide the requested content, such as interactive television applications, to media client 110. The requested content may include additional instructions (e.g., programs and/or scripts for remote control 100) that may be used to adapt particular key functions, of remote control 100, to the requested content. Media client 110 may receive the requested content, may transmit the additional instructions to remote control 100. Remote control 100 may execute the instructions to re-map particular key functions to provide a customized remote control interface for the requested application. In one implementation, remote control 100 may recognize a change in its orientation and adapt key functionality to reflect the changed orientation. Re-mapping of the remote control 100 may, thus, cause remote control 100 to send different signals (e.g., infrared codes, wireless network signals, etc.) to media client 110 when the user presses the same button at different times.

Figure 3:
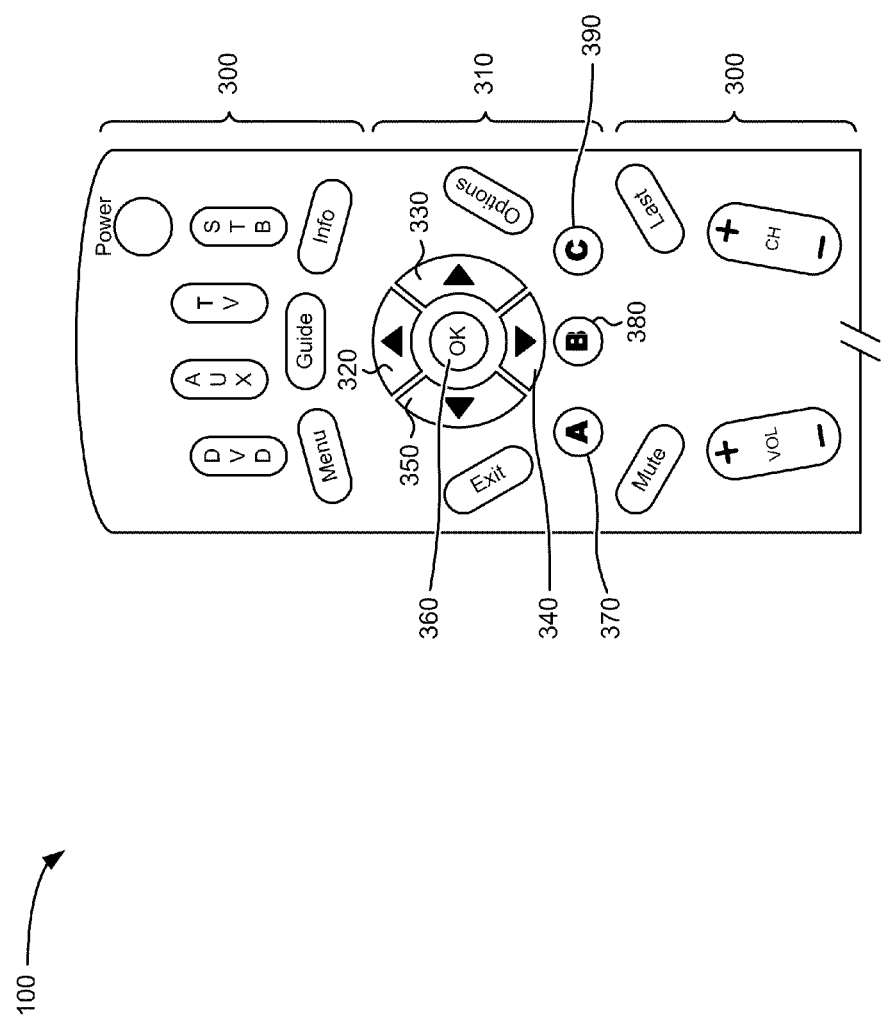
FIG. 3 is diagram illustrating a perspective view of an example portion of a remote control shown in FIGS. 1 and 2.

FIG. 3 depicts example components of remote control 100. As shown, remote control 100 may include a first set 300 of control buttons and a second set 310 of control buttons. Although FIG. 3 shows control buttons associated with remote control 100, in other implementations, remote control 100 may include a touch screen display (or other input mechanisms) and may omit the control buttons. The touch screen display may be configured to display images of control buttons (e.g., similar to the control buttons provided in FIG. 3) and to receive a user input when the user touches the touch screen display. For example, the user may provide an input to the touch screen display directly, such as via the user's finger, or via other input objects, such as a stylus. User inputs received via the touch screen display may be processed by components and/or devices operating in remote control 100. The touch screen display may permit the user to interact with remote control 100 in order to cause remote control 100 to perform one or more operations.

First set 300 of control buttons may include one or more control buttons that cause remote control 100 to perform one or more operations. For example, first set 300 of control buttons may cause remote control 100 to transmit one or more signals (e.g., to media client 110) representative of the one or more operations. As shown in FIG. 3, first set 300 of control buttons may include a power button (e.g., to cause, when selected by a user, remote control 100 to transmit a signal instructing a device (e.g., media client 110) to power on or power off); a digital video recorder (DVD) button (e.g., to cause, when selected by a user, remote control 100 to transmit a signal instructing a DVD player (not shown) to perform an operation); an auxiliary (AUX) button (e.g., to cause, when selected by a user, remote control 100 to transmit a signal instructing an auxiliary device (e.g., a stereo) to perform an operation); a TV button (e.g., to cause, when selected by a user, remote control 100 to transmit a signal instructing display device 120 to perform an operation); and a STB button (e.g., to cause, when selected by a user, remote control 100 to transmit a signal instructing media client 110 to perform an operation).

As further shown in FIG. 3, first set 300 of control buttons may also include a menu button, a guide button, and an information (Info) button. The menu button, when selected by a user, may cause remote control 100 to transmit a signal instructing media client 110 to display (e.g., on display device 120) a television menu (e.g., a menu that provides access to features associated with a subscription multimedia service). The guide button, when selected by a user, may cause remote control 100 to transmit a signal instructing media client 110 to display (e.g., on display device 120) a television guide (e.g., an interactive programming guide, a listing of all available television channels, etc.). The information button, when selected by a user, may cause remote control 100 to transmit a signal instructing media client 110 to display (e.g., on display device 120) information about currently displayed television content. First set 300 of control buttons may also include a channel button (e.g., with an up channel portion and a down channel portion) and a volume button (e.g., with an up volume portion and a down volume portion).

Second set 310 of control buttons may include one or more adaptable control buttons that cause remote control 100 to perform one or more operations. For example, second set 310 of control buttons may cause remote control 100 to transmit a first set of signals (e.g., to media client 110) when in a first mode, and to transmit a second set of signals (e.g., to media client 110 or local router 240) when in a second mode. In some implementations, second set of control buttons may have other modes (e.g., a third mode, a fourth mode, a fifth mode, etc.). As shown in FIG. 3, second set 310 of control buttons may include four directional buttons 320, 330, 340 and 350; an OK button 360; and three multifunction buttons A 370, B 380, and C 390. In one implementation multifunction buttons A 370, B 380, and C 390 may conform to standard for the OpenCable Application Platform (OCAP).

Some or all of buttons 320-390 may provide signals that may be adapted depending on a mode identified by remote control 100. For example, in a first, or default, mode, buttons 320-390 may perform various functions for television viewing and program selection. Directional buttons 320-350 may permit a user (e.g., via remote control 100) to navigate through a menu displayed by media client 110 (e.g., via display device 120). OK button 360 may permit a user (e.g., via remote control 100) to select an item of a menu displayed by media client 110 (e.g., via display device 120). Multifunction button A 370 may act as a "favorites" button 370, and, when selected by a user, may cause remote control 100 to transmit a signal instructing media client 110 to access a user-defined content list (e.g., a favorite television channels list, a preferred television channels list, a list of VOD, a list of HD-VOD, a list of user-defined television channels, a list of interactive television applications, etc.) and display the user-defined content list on display device 120. Multifunction button B 380 may act as a "features" button (e.g., to cause, when selected by a user, remote control 100 to transmit a signal instructing media client 110 to access local traffic, weather, and other information). Multifunction button C 390 may act as an "on demand" button (e.g., to cause, when selected by a user, remote control 100 to transmit a signal instructing media client 110 to access VOD, HD-VOD, on-demand services, etc.).

In a second mode, buttons 320-390 may perform various functions for providing input to, for example, interactive television applications. As used herein, the term "interactive television application" may refer to an application that may receive and respond to user input (e.g., via a remote control or control buttons on a video client device). For example, an interactive television application may include variations of known social networking applications (e.g., Facebook®, Twitter®, MySpace®, etc.), image-sharing and/or video-sharing applications (e.g., YouTube®, Blip®, Veoh®, etc.), applications from particular content providers, regional content applications (e.g., weather, traffic, local news), games, etc. In some cases, interactive television applications may also be referred to as "apps" or "widgets."

In the second mode, directional buttons 320-350 may permit a user (e.g., via remote control 100) to perform functions particularly related to an interactive television application. For example, directional buttons 320-350 may provide signals to modify a feature of the interactive television application without affecting an underlying program (e.g., television program), such as altering volume of the interactive television application, accelerating/decelerating a character within the interactive television application, turning a page/screen shown on the interactive television application, etc. Similarly, buttons 370-390 may be associated with particular functions related to the interactive television application.

Although FIG. 3 shows example components of remote control 100, in other implementations, remote control 100 may contain fewer components, different components, differently arranged components, and/or additional components than depicted in FIG. 3. For example, remote control 100 may include addition buttons on a back or side surface that may be grouped with first set 300 of control buttons or second set 310 of control buttons. In still other implementations, one or more components of remote control 100 may perform one or more other tasks described as being performed by one or more other components of remote control 100.

Figure 4:
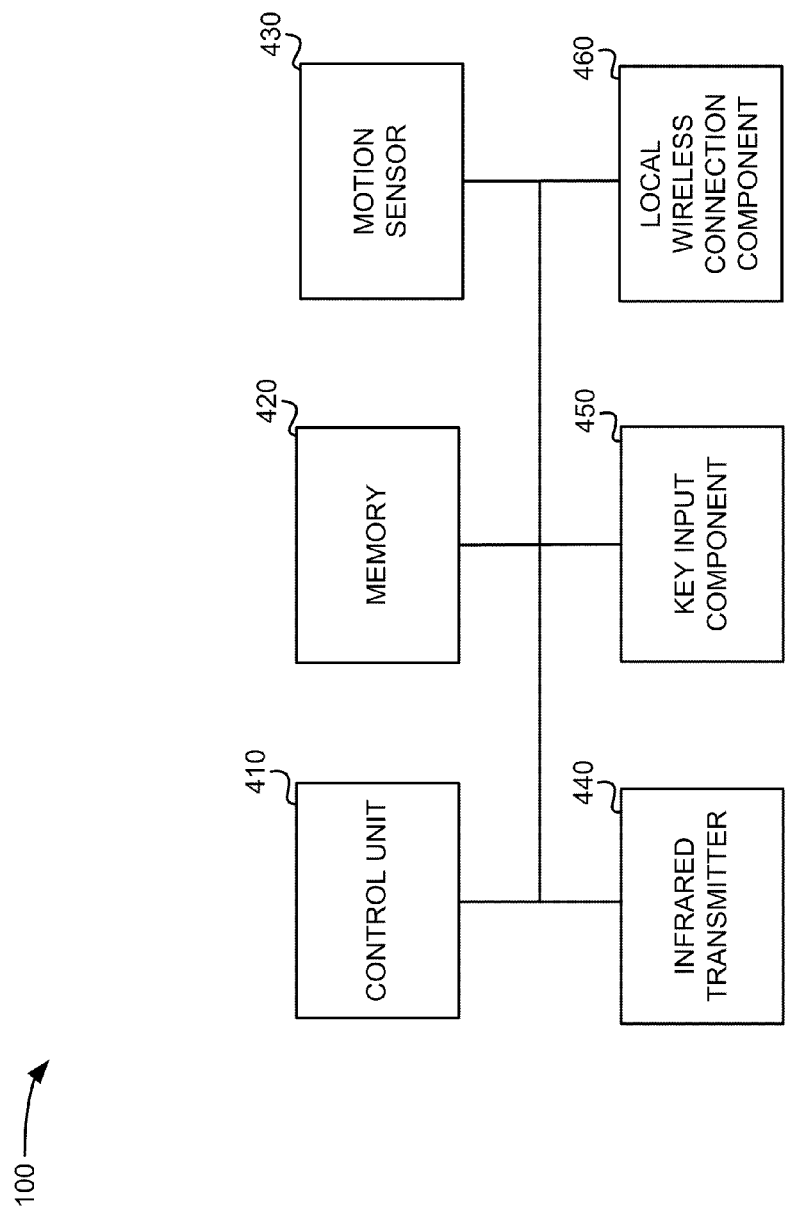
FIG. 4 is a block diagram of example components of the remote control of FIGS. 1-3.

FIG. 4 provides a block diagram of example components of remote control 100. As shown, remote control 100 may include a control unit 410, a memory 420, a motion sensor 430, an infrared transmitter 440, a key input component 450, and a local wireless network connection component 460.

Control unit 410 may include a processor, microprocessor, or other type of processing unit that may interpret and execute instructions. Memory 420 may include a dynamic or static storage device that may store information and instructions for execution by control unit 410. For example, memory 420 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. Memory 420 may store, for example, client programs and/or scripting associated with mapping of button functions on remote control 100.

Motion sensor 430 may include one or more components capable of sensing motion of remote control 100. Motion sensor 430 may include an accelerometer and/or a gyrometer. An accelerometer is a device for measuring acceleration. The accelerometer may be implemented as a circuit that detects acceleration of remote control 100 when it is moved by the user. A gyrometer is a device for measuring tilt. The gyrometer may be implemented as a circuit that detects tilting of remote control 100. In one implementation, motion sensor 430 may be used to identify movements of remote control 100 that may be interpreted as commands (e.g., commands that may be adapted for different functions). In another implementation, motion sensor 430 may be used to identify an orientation of remote control 100 (e.g., with respect to media client 110). In some implementations (e.g., where motion sensor 430 is omitted), motion and/or orientation of remote control 100 may be estimated by media client 110 based on reception of infrared signals emitted by infrared transmitter 440.

Infrared transmitter 440 may include circuitry for transmitting an infrared signal from one or more locations on remote control 100. The signal may be particularly used to transmit when buttons, such as buttons 320-390, on remote control 100 are pushed by the user.

Key input component 450 may be circuitry designed to determine which buttons, such as buttons 320-390, have been pressed by the user. An indication of the buttons that have been pressed may be transmitted, via infrared transmitter 440 or local wireless network component 460, to media client 110.

Local wireless connection component 460 may include circuitry designed to implement a local wireless connection. For example, remote control 100 may use a local wireless connection to connect to media client 110 via a Bluetooth connection, an IEEE 802.11 ("WiFi") based connection, or another type of RF connection. The wireless connection implemented by local wireless connection component 460 may generally be a relatively short-range connection.

In some implementations, both infrared transmitter 440 and local wireless connection component 460 may be implemented in remote control 100. In other implementations, only local wireless connection component 460 may be implemented. For instance, local wireless connection component 460 may implement a Bluetooth connection with media client 110, where the Bluetooth connection is used to send information relating to button presses and information generated by motion sensor 430 to media client 110. Alternatively, one or more infrared transmitters 440 may be exclusively used to transmit information to media client 110, while wireless connection component 460 may be exclusively used to receive information from media client 110.

Although FIG. 4 shows example components of remote control 100, in other implementations, remote control 100 may contain fewer components, different components, differently arranged components, and/or additional components than depicted in FIG. 4. In still other implementations, one or more components of remote control 100 may perform one or more other tasks described as being performed by one or more other components of remote control 100.

Figure 5:
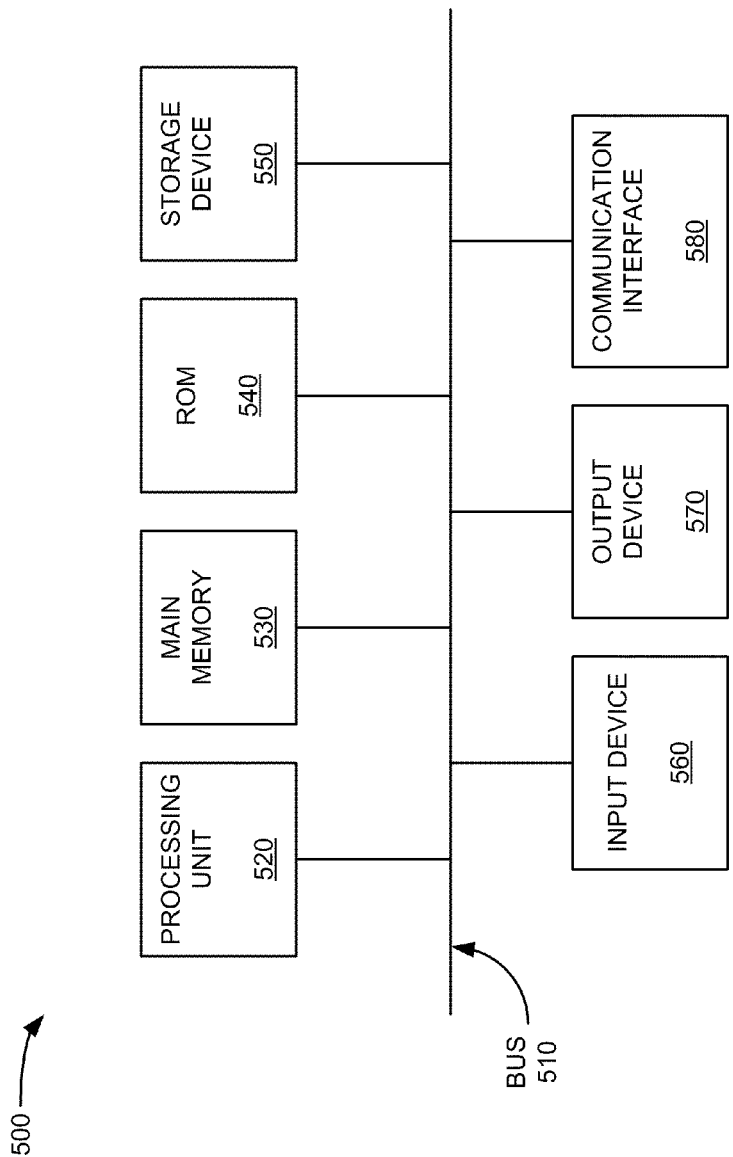
FIG. 5 illustrates example components of a media client, a content server, and/or a user device of the network depicted in FIG. 2.

FIG. 5 is an example diagram of a device 500 that may correspond to media client 110, content server 220 and/or user device 250. As illustrated, device 500 may include a bus 510, a processing unit 520, a main memory 530, a read-only memory (ROM) 540, a storage device 550, an input device 560, an output device 570, and/or a communication interface 580. Bus 510 may include a path that permits communication among the components of device 500.

Processing unit 520 may include one or more processors, microprocessors, or other types of processing units that may interpret and execute instructions. Main memory 530 may include one or more RAMs or other types of dynamic storage devices that may store information and instructions for execution by processing unit 520. ROM 540 may include one or more ROM devices or other types of static storage devices that may store static information and/or instructions for use by processing unit 520. Storage device 550 may include a magnetic and/or optical recording medium and its corresponding drive.

Input device 560 may include a mechanism that permits a user to input information to device 500, such as a keyboard, a mouse, a pen, a microphone, voice recognition and/or biometric mechanisms, a remote control, a touch screen, etc. Output device 570 may include a mechanism that outputs information to the user, including a display, a printer, a speaker, etc. Communication interface 580 may include any transceiver-like mechanism that enables device 500 to communicate with other devices, networks, and/or systems. For example, communication interface 580 may include mechanisms for communicating with another device or system via a network, such access network 210 or a home media network in customer premises 230.

As described herein, device 500 may perform certain operations in response to processing unit 520 executing software instructions contained in a computer-readable medium, such as main memory 530. A computer-readable medium may be defined as a physical or logical memory device. A logical memory device may include memory space within a single physical memory device or spread across multiple physical memory devices. The software instructions may be read into main memory 530 from another computer-readable medium, such as storage device 550, or from another device via communication interface 580. The software instructions contained in main memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows example components of device 500, in other implementations, device 500 may contain fewer components, different components, differently arranged components, and/or additional components than depicted in FIG. 5. In still other implementations, one or more components of device 500 may perform one or more other tasks described as being performed by one or more other components of device 500.

Figure 6:
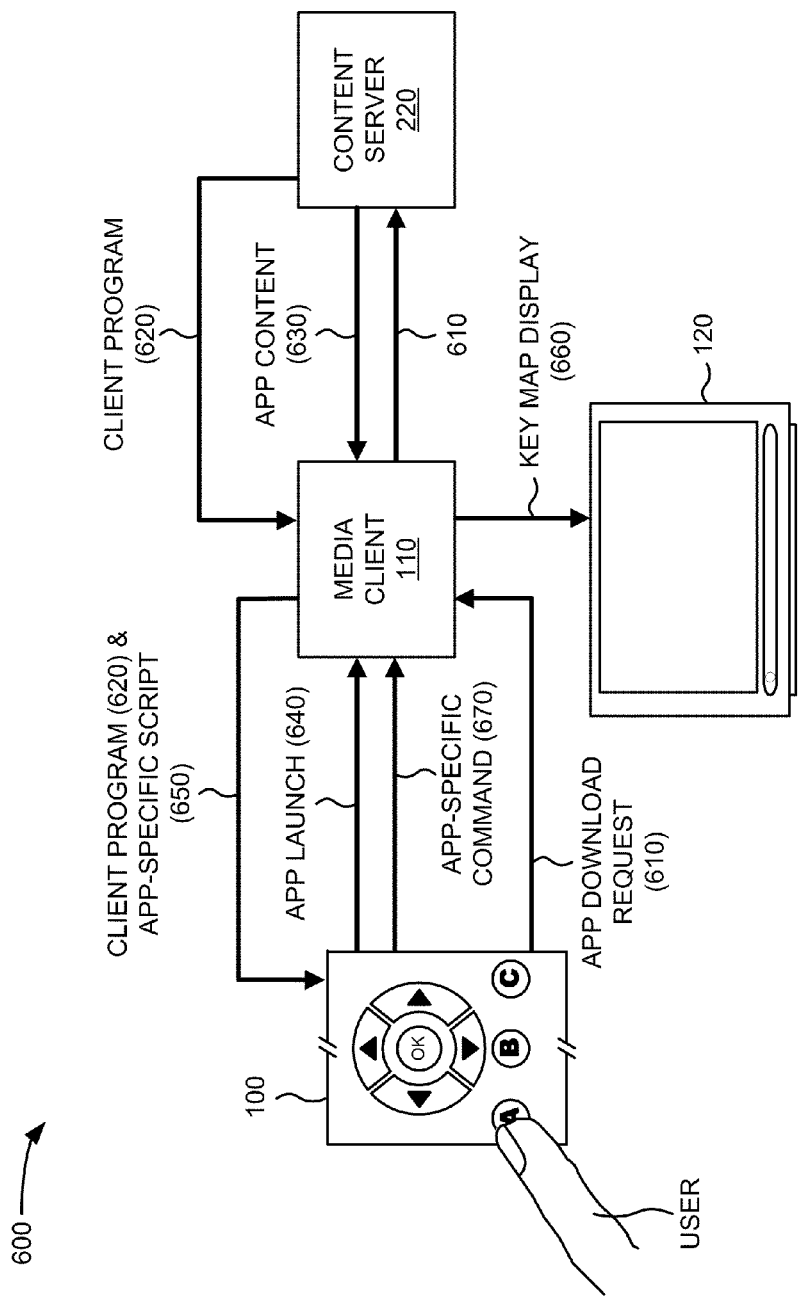
FIG. 6 depicts a diagram of example interactions between components of an example portion of the network illustrated in FIG. 2.

FIG. 6 provides a diagram illustrating communications among devices of a portion 600 of network 200. As shown network portion 600, may include remote control 100, media client 110, display device 120, and content server 220. Remote control 100, media client 110, display device 120, and content server 220 may include the features described above in connection with, for example, one or more of FIGS. 1-5.

In operation, remote control 100 may be provided with a default key mapping that may be obtained, for example, via an initial synchronization operation with media client 110 or by an original equipment manufacturer (OEM) configuration. An initial synchronization may also supply media client 110 with information regarding the type (e.g., model) of remote control device 100. The default key mapping may provide button functions for remote control 100 that are configured, for example, for television viewing. A user may desire to download a particular interactive television application ("app") to media client 110 and select an application (e.g., from menu of available applications) using remote control 100. Using signals from the default key mapping, remote control 100 may send an app download request 610 to media client 110. In one implementation, app download request 610 may be sent to media client 110 using an IR signal. In another implementation, app download request 610 may be sent to media client 110 using a two-way wireless communication channel (e.g., Bluetooth, WiFi via local router 240, etc.).

Media client 110 may forward app download request 610 to content server 220 (via, e.g., access network 210). Content server 220 may respond to app download request 610 by providing a client program 620 and app content 630 to media client 110. Client program 620 may include, for example, software code to enable media client 110 to install a virtual machine application on remote control 100. The virtual machine application may enable two-way communication between remote control 100 and media client 110 to allow remote control 100 to receive and implement scripts for mapping buttons. In one implementation, client program 620 may only need to be provided once, as part of the first interactive television application, and may be used subsequently on other downloaded applications. The app content 630 may include, for example, program code for the requested interactive television application (e.g., for use by media client 110), one or more companion scripts for mapping keys for the requested application (e.g., to be forwarded to remote control 100), and one or more key maps (e.g., for presentation on display device 120).

In one implementation, multiple types (e.g., models, brands, etc.) of remote controls may be supported using the systems and/or methods described herein. Thus, multiple companion scripts and key maps may be included with app content 630, such that each of the companion scripts and/or key maps may be adapted to a particular type of remote control. Thus, media client 110 may identify the type of remote control 100 (e.g., as part of an initial synchronization process) and select the script that matches the identified type of remote control 100. In another implementation, media client 110 may provide the type of remote control 100 to content server 220 as part of app download request 610, so that content server 220 may download only the script and key map information suitable for remote control 100.

At some point in time after app content 630 is received by media client 110 and made available for selection by the user (e.g., via remote control 100), the user may cause remote control 100 to launch the previously downloaded application on media client 110. An app launch signal 640 may be sent to media client 110 from remote control 100 using, for example, default key mapping for remote control 100 as described above in connection with FIG. 3. In one implementation, app launch signal 640 may be sent to media client 110 using an IR signal. In another implementation, app launch signal 640 may be sent to media client 110 using a two-way wireless communication channel.

Media client 110 may receive app launch signal 640 and, in response, send client program 620 and an app-specific script 650 to remote control 100. Client program 620 may be received by remote control 100 and installed to enable adaptive key mapping. App-specific script 650 may be extracted by media client 110 from, for example, app content 630. App-specific script 650 may include instructions to re-map some or all of the buttons of remote control 100 (e.g., buttons 320-390) to correspond to particular functions associated with the launched application. In an implementation, app-specific script 650 may include instructions for more than one configuration, and media client 110 may prompt a user to select one of multiple app-specific scripts 650. In some implementations, client program 620 and app-specific script 650 may be implemented using Lua, JavaScript, Perl, or another programming language. Client program 620 and app-specific script 650 may be sent to media client 110 using, for example, the two-way wireless communication channel.

Media client 110 may also provide a key map display 660 to be presented on display device 120. Key map display 660 may be extracted, from app content 630, by media client 110 and presented to the user to correspond to the key mapping of app-specific script 650. Key map display 660 may identify to the user particular functions of re-mapped buttons (e.g., buttons 320-390). In one implementation, media client may present key map display 660 in one of multiple graphical formats (or "skins"), as selected by the user and using button function information extracted from app content 630. An example key map display for an interactive television application is described further below in connection with FIG. 9.

Using client program 620, remote control 100 may implement app-specific script 650 to provide an application-specific button mapping of remote control 100 for the launched application (e.g., launched in response to app launch signal 640). The user may press one of the re-mapped buttons on remote control 100 (e.g., one of buttons 320-390) to send an app-specific command 670 to media client 100. In one implementation, app-specific command 670 may be sent to media client 110 using an IR signal. In another implementation, app-specific command 670 signal may be sent to media client 110 using a two-way wireless communication channel.

Although FIG. 6 shows example communications among devices of network portion 600, in other implementations, network portion 600 may contain fewer devices, different devices, differently arranged devices, or additional devices than depicted in FIG. 6. Additionally, or alternatively, one or more devices of network portion 600 may perform one or more other tasks described as being performed by one or more other devices of network portion 600.

Figure 7:
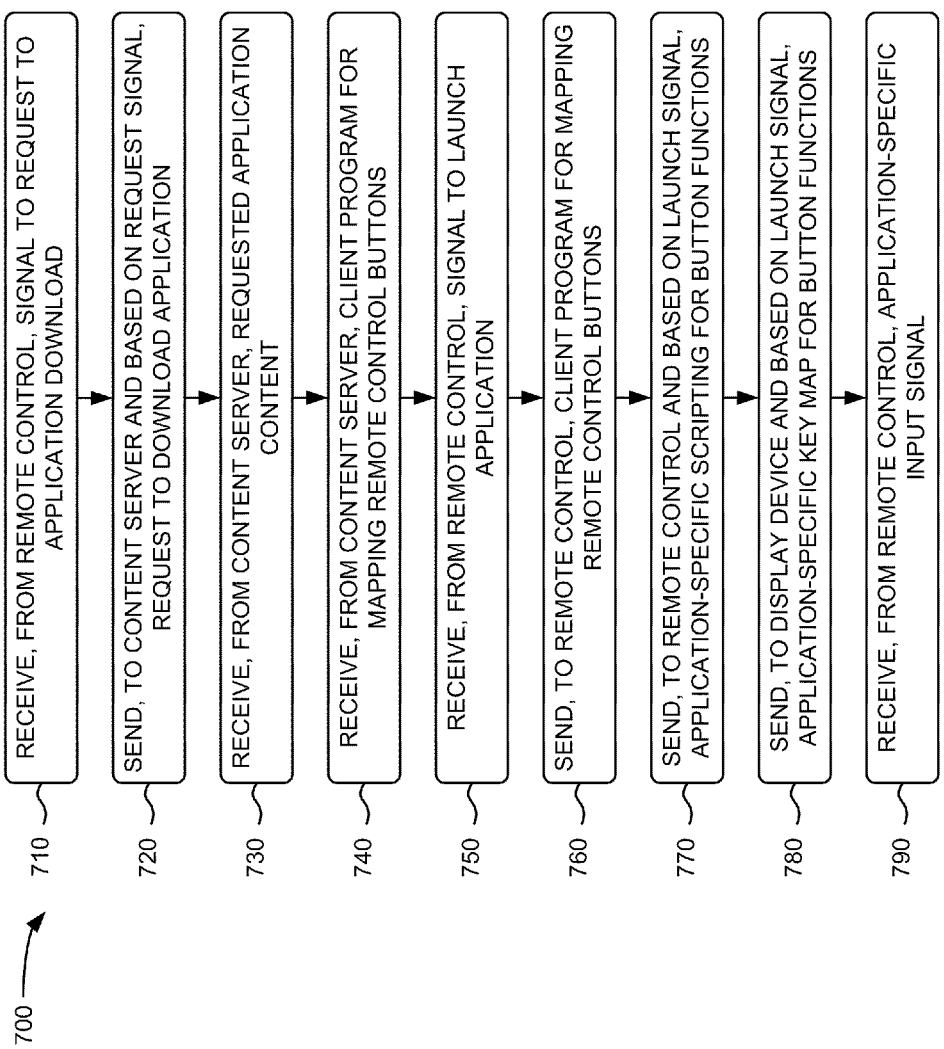
FIG. 7 is a flow chart illustrating an example process for adapting key functionality of a remote control device according to an implementation herein.

FIG. 7 provides a flow chart of an example process 700 for adapting key functionality of a remote control device according to an implementation. Some or all of process 700 may be performed by media client 110. In some implementations, some or all of process 700 may also be performed by one or more devices (e.g., remote control 100, content server 220) in association with media client 110.

Process 700 may include receiving, from a remote control, a signal to request an application download (block 710), sending to a content server a request to download the application (block 720), receiving, from the content server, the requested application (block 730), and receiving, from the content server, a client program for mapping remote control buttons (block 740). For example, as described above in connection with FIG. 6, remote control 100 may send app download request 610 to media client 110. Media client 110 may forward app download request 610 to content server 220 (via, e.g., access network 210). Content server 220 may respond to app download request 610 by providing client program 620 and app content 630 to media client 110. Client program 620 may include, for example, software code to enable media client 110 to install a virtual machine application on remote control 100. The virtual machine application may enable two-way communication between remote control 100 and media client 110 to allow remote control 100 to receive and implement scripts for mapping buttons. In one implementation, client program 620 may only need to be provided once, as part of the first interactive television application, and may be used subsequently on other downloaded applications. App content 630 may include, for example, program code for the requested interactive television application (e.g., for use by media client 110), a companion script key mapping for the requested application (e.g., to be forwarded to remote control 100), and a key map (e.g., for presentation on display device 120).

Process 700 may further include receiving, from the remote control, a signal to launch the application (block 750), sending, to the remote control, the client program for mapping remote control buttons (block 760), and sending, to the remote control and based on the launch signal, application-specific scripting for button functions (block 770). For example, as described above in connection with FIG. 6, app launch signal 640 may be sent to media client 110 from remote control 100 using, for example, default key mapping for remote control 100 as described above in connection with FIG. 3. Media client 110 may receive app launch signal 640 and, in response, send client program 620 and app-specific script 650 to remote control 100. App-specific script 650 may be extracted, for example, from app content 630. Client program 620 may be received by remote control 100 and installed to enable adaptive key mapping. App-specific script 650 may include instructions to re-map some or all of the buttons of remote control 100 (e.g., buttons 320-390) to correspond to particular functions associated with the launched application. In some implementations, client program 620 and app-specific script 650 may be implemented using Lua, JavaScript, Perl, or another programming language.

Process 700 may further include sending, to a display device and based on the launch signal, an application-specific key map for button functions (block 780) and receiving, from the remote control, an application-specific input signal (block 790). For example, as described above in connection with FIG. 6, Media client 110 may also provide key map display 660 to be presented on display device 120. Key may display 660 may be extracted, from app content 630, by media client 110 and presented to the user to correspond to the key mapping of app-specific script 650. Key map display 660 may identify to the user particular functions of re-mapped buttons (e.g., buttons 320-390). Using client program 620, remote control 100 may implement app-specific script 650 to provide an application-specific button mapping of remote control 100 for the launched application (e.g., launched in response to app launch signal 640). The user may press one of the re-mapped buttons on remote control 100 (e.g., one of buttons 320-390) to send app-specific command 670 to media client 100.

Figure 8:
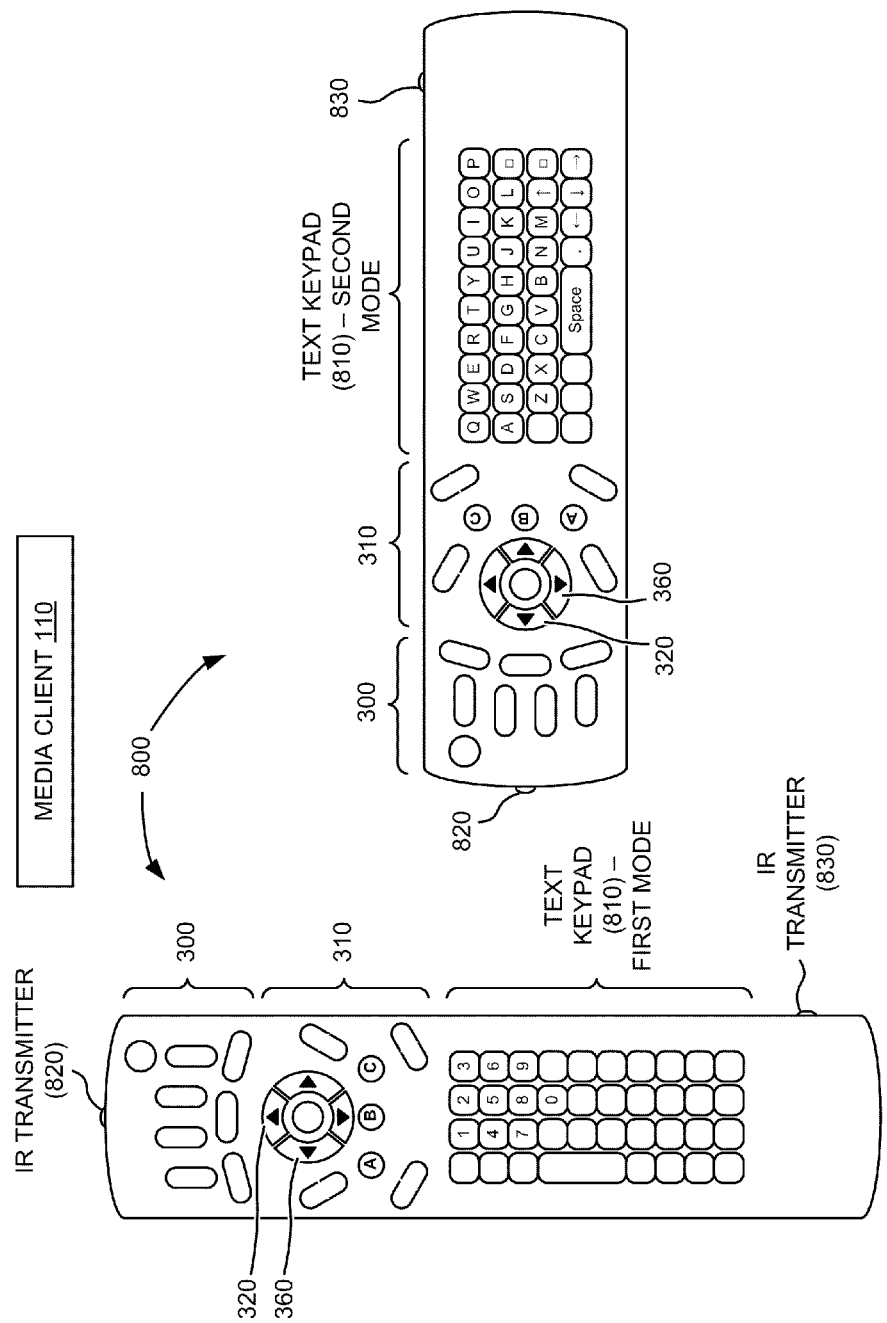
FIG. 8 is an example diagram illustrating a two-way remote control with adaptive character entry according to an implementation herein.

FIG. 8 is an example diagram illustrating a two-way remote control 800 with adaptive character entry according to an implementation herein. Referring to FIG. 8, remote control 800 may include first set 300 of control buttons, second set 310 of control buttons, a text keypad 810, and infrared (IR) transmitters 820 and 830. Remote control 800 may include, for example, features of remote control 100 described above in connection with FIGS. 2-4. First set 300 of control buttons and second set 310 of control buttons may include features described above in connection with, for example, FIG. 3.

Text keypad 810 may include a group of physical buttons, virtual buttons, or another input mechanism that may adaptively permit user entry of characters. Text keypad 810 may include for example, physical buttons with display elements (e.g., LED or LCD) that may be displayed in conjunction with a particular mode. In one implementation, buttons for text keypad 810 may include adaptive displays that may alternately show, for example, letters or numbers, depending on the status (e.g., active or inactive) of text keypad 810. In a first mode, text keypad 810 may include, for example, numeric keys functions for channel selections, etc. In a second mode, text keypad 810 may include, for example, a QWERTY keyboard arrangement, and an alpha numeric key arrangement, or another type of key arrangement suitable for text input.

As shown in FIG. 8, text keypad 810 may selectively toggle between a first mode and a second mode to permit user entry of characters depending, for example, on an orientation of remote control 800 with respect to media client 110. Text keypad 810 may be in the first mode, for example, when remote control 800 is oriented with IR transmitter 820 directed substantially toward media client 110. Conversely, text keypad 810 may be in the second mode, for example, when remote control 800 is oriented with IR transmitter 830 directed substantially toward media client 110.

Second set 310 of control buttons may also be adapted to reflect a change in orientation of remote control 800. For example, in the orientation of remote control 800 where text keypad 810 is in the first mode, directional buttons 320 and 360 may provide signals corresponding to up and left, respectively. Also, IR transmitter 820 may be activated, while IR transmitter 830 may be deactivated. However, when the orientation of remote control 800 is changed to where text keypad 810 is in the second mode, directional buttons 320 and 360 may provide signals corresponding to left and down, respectively. Furthermore, IR transmitter 830 may be activated, while IR transmitter 820 may be deactivated.

In one implementation, button functionality of second set 310 of control buttons and activation of the first/second mode of text keypad 810 may be determined based on the orientation of remote control 800 with respect to media client 110. For example, remote control may determine its orientation using motion sensor 430 (of FIG. 4) and activate the appropriate button functionality of second set 310 of control buttons and text keypad 810. In another implementation, buttons on remote control 800 may be adaptively changed to reflect a default orientation based on the user's selection of a particular interactive television application. For example, button functionality of second set 310 of control buttons and activation of the first/second mode of text keypad 810 may be determined based on a client program (e.g., client program 620) and app-specific script (e.g., app-specific script 650) as described above in connection with FIG. 6. Thus, selection, by a user of remote control 800, of a particular interactive television application (e.g., an application that requires extensive text input from the user) may cause media client 110 to send to remote control 800 an app-specific script that activates the first/second mode keypad 810, adapts button functionality of second set 310 of control buttons, and activates IR transmitter 830.

The illustration of FIG. 8 provides an example of a remote control with adaptive control buttons. Other formats and variations may be used. For example, while FIG. 8 shows two IR transmitters, in other implementations more than two IR transmitters, one or more wireless connections, or a combination of an IR transmitter and wireless connection may be used to transmit signals. Furthermore, a variety of control button arrangements may be used.

Figure 9:
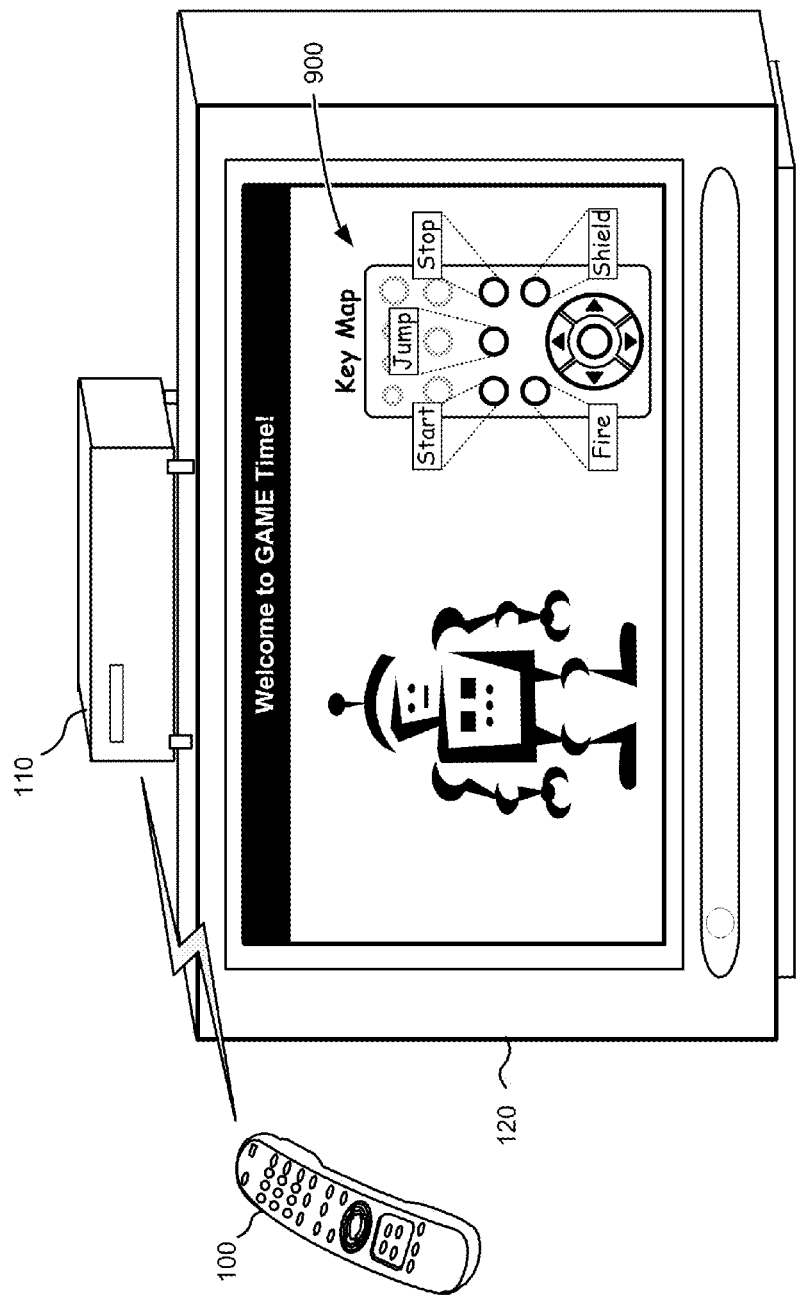
FIG. 9 is an example diagram illustrating a key map for the two-way remote control of FIG. 8 according to an implementation herein.

FIG. 9 provides an example key map display 900 for an interactive television application, as presented on display device 120. Key map display 900 may be presented, for example, at the launch (e.g., welcome screen) of an interactive television application. Key map 900 may identify to the user particular functions of re-mapped buttons for the particular interactive television application (e.g., buttons 320-390). In one implementation, key map display 900 may include a model-specific representation of a least a portion of the user's remote control (e.g., remote control 100) with labels (e.g., "start," "jump," "stop," "fire," and "shield") to identify functions of particular buttons. In one implementation, remote control 100 may include a dedicated button for requesting a display of a key map (e.g., key map display 900). In another implementation, each interactive television application may include a menu selection for requesting key map display 900.

Media client 110 may store a button layout and corresponding graphical representation of remote control 100 to configure key map display 900 to the model of the currently detected remote control 100. Media client 110 may also store multiple graphical formats (e.g., skins) that may be used to present key map display 900. The illustration of FIG. 9 provides an example of key map display 900. Other formats and variations may be used.

Implementations described herein may provide systems and/or methods that may receive, from a remote control device, a signal to launch a selected interactive television application and may send, to the remote control, a client program for reprogramming buttons on the remote control device. The systems and/or methods may send, to the remote control device, scripting for button functions of the remote control, where the scripting is based on the selected interactive television application. The remote control device may execute scripting on the client program to reprogram the buttons functions. The systems and/or methods may present, on a display device, a button map that corresponds to the scripting, and may receive, from the remote control device, a signal based on the scripting.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while a series of blocks has been described with regard to the flowchart of FIG. 6, the order of the blocks may differ in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method implemented by a media client, the method comprising:
   receiving, by the media client and from a remote control device, a signal to launch a selected interactive television application;
   sending, by the media client and to the remote control device, a client program for applying application-specific scripting to map buttons on the remote control device;
   sending, by the media client and to the remote control device, particular scripting for button functions of the remote control device, wherein the particular scripting is based on the selected interactive television application;
   presenting, by the media client on a display device, a button map that corresponds to the particular scripting; and
   receiving, by the media client and from the remote control device, a signal based on the particular scripting.

2. The method of claim 1, further comprising:
   requesting, by the media client and from a content server, the selected interactive television application; and
   receiving, by the media client and from the content server, the selected interactive television application, wherein the selected interactive television application includes the particular scripting and the button map.

3. The method of claim 2, further comprising:
determining, by the media client, a type of the remote control device,
wherein requesting the selected interactive television application includes identifying, to the content server, the type of the remote control device.

4. The method of claim 1, wherein the particular scripting for button functions of the remote control device is configured for a particular type of the remote control device.

5. The method of claim 1, further comprising:
requesting, by the media client and from a content server, the client program for mapping buttons on the remote control device; and
receiving, by the media client and from the content server, the client program.

6. The method of claim 1, wherein the signal to launch the selected interactive television application and the signal based on the particular scripting are infrared transmissions.

7. The method of claim 1, wherein the client program for mapping buttons on the remote control device and the particular scripting for button functions of the remote control are sent using a local wireless connection.

8. The method of claim 1, wherein the particular scripting associates signals, different than default signals, with a set of buttons on the remote control device.

9. The method of claim 1, wherein the presenting a button map that corresponds to the particular scripting comprises:
extracting button function information from the selected interactive television application,
retrieving, from a memory associated with the media client, a particular graphical button map format from a group of graphical button map formats, and
applying the extracted button function information to the particular graphical button map format.

10. A remote control device, comprising:
a memory to store:
a client program for mapping buttons on the remote control device, and
a default set of button functions; and
a control unit to:
send, in response to a user input, a first signal to a media client to launch a selected interactive television application,
receive, from the media client, scripting for button functions of the remote control device,
execute, using the client program, the scripting to alter the default set of button functions to a set of button functions associated with the selected interactive television application, and
send, in response to another user input, a second signal to the media client based on the set of button functions associated with the selected interactive television application.

11. The remote control device of claim 10, further comprising one or more of:
a motion sensor to detect an orientation of the remote control device in relation to the media client.

12. The remote control device of claim 10, further comprising:
a first infrared transmitter to send one of the first signal or second signal to the media client when the remote control device is in a first orientation in relation to the media client; and
a second infrared transmitter to send one of the first signal or second signal to the media client when the remote control device is in a second orientation in relation to the media client.

13. The remote control device of claim 10, further comprising:
a local wireless connection component, where the local wireless connection component is configured to receive, from the media client, scripting for button functions of the remote control device.

14. The remote control device of claim 13, where the local wireless connection component is configured to send, to the media client, one of the first signal or second signal.

15. A device, comprising:
a memory to store:
a plurality of instructions, and
an interactive television application; and
a processor to execute instructions in the memory to:
receive, from a remote control device, a signal to launch the interactive television application,
send, to the remote control device, a client program for adaptively reprogramming buttons on the remote control device,
send, to the remote control device, a script of button functions for the interactive television application, where the script of button functions is different than a default set of button functions,
present, on a display device, a button map that corresponds to the script, and
receive, from the remote control device, a signal based on the script.

16. The device of claim 15, where the processor is further to execute instructions to:
request, from a content server and via a network, the interactive television application; and
receive, from the content server and via the network, the interactive television application, where the interactive television application includes the script and the button map.

17. The device of claim 16, where the processor is further to execute instructions to:
identify a type of the remote control device, where the interactive television application includes multiple scripts for multiple types of remote control devices, and where the device selects the script for the identified type of the remote control device.

18. The device of claim 15, where the device is one of:
a set-top box,
a computer,
a cable card, or
a portable electronic device.

19. The device of claim 15, where the signal to launch is received via an infrared transmission, and where the signal based on the script is send via a wireless network connection.

20. The device of claim 15, where the memory is further to store multiple graphical button map formats, and where the processor is further to execute instructions to:
receive, from the remote control device, a signal to select a particular one of the multiple graphical button map formats, and
apply button functions for the interactive television application to the particular graphical button map format, where the button map is presented on the display device using the particular graphical button map format.

21. A method implemented by a remote control device, the method comprising:
sending, by the remote control device and in response to a user input, a first signal to a media client to launch a selected interactive television application;
receiving, by the remote control device and from the media client, a script for button functions of the remote control, wherein the script includes button functions, different than a set of default button functions, that are associated with the selected interactive television application;

executing, by the remote control device and using the client program, the script to alter the set of default button functions to button functions associated with the selected interactive television application; and sending, by the remote control device and in response to another user input, a second signal to the media client based on one of the button functions associated with the selected interactive television application.

22. The method of claim 21, further comprising:

altering one or more of the button functions associated with the selected interactive television application based on detecting of a change in an orientation of the remote control device in relation to the media client.

23. A non-transitory computer-readable medium containing instructions executable by a processor, the computer-readable medium comprising:

one or more instructions for receiving, from a remote control device, a signal to launch a selected interactive television application;

one or more instructions for sending, to the remote control device, a client program for mapping buttons on the remote control device;

one or more instructions for sending, to the remote control device, scripting for button functions of the remote control device, wherein the scripting is configured to be implemented by the client program to alter the button functions of the remote control device based on the selected interactive television application;

one or more instructions for presenting, on a display device, a button map that corresponds to the scripting; and one or more instructions for receiving, from the remote control device, a signal based on the scripting.

24. The non-transitory computer-readable medium of claim 23, further comprising:

one or more instructions for determining a type of the remote control device, wherein the scripting for button functions of the remote control device is adapted to the type of the remote control device.

25. The non-transitory computer-readable medium of claim 23, further comprising:

one or more instructions for storing multiple graphical button map formats, one or more instructions for receiving, from the remote control device, a signal selecting a particular one of the multiple graphical button map formats, where the one or more instructions for presenting the button map include presenting the button map on the display device using the particular one of the multiple graphical button map formats.

* * * * *